J. REAGAN.
BOILER AND OTHER FURNACE.
APPLICATION FILED AUG. 28, 1914. RENEWED OCT. 15, 1915.
1,171,803.
Patented Feb. 15, 1916.
8 SHEETS—SHEET 2.
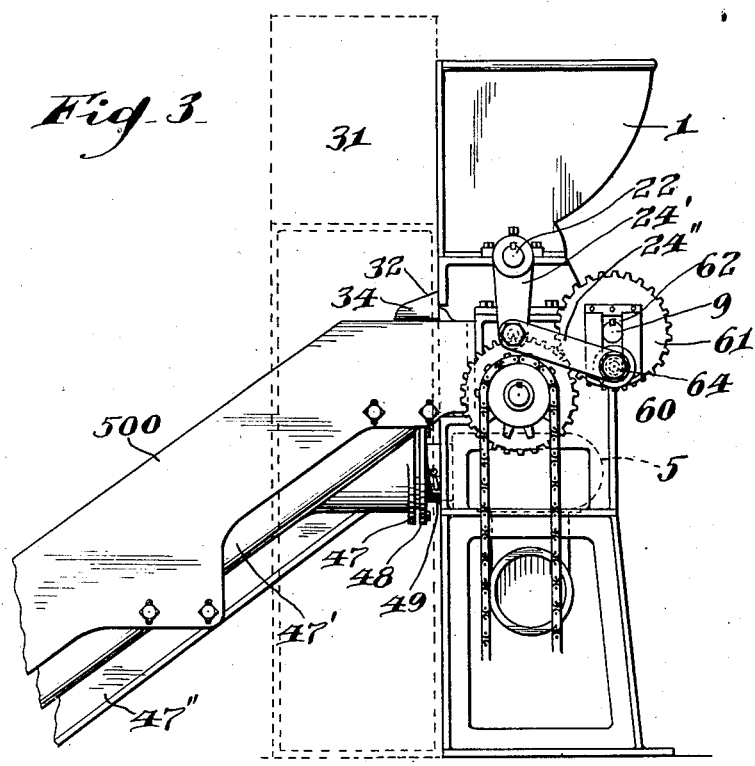
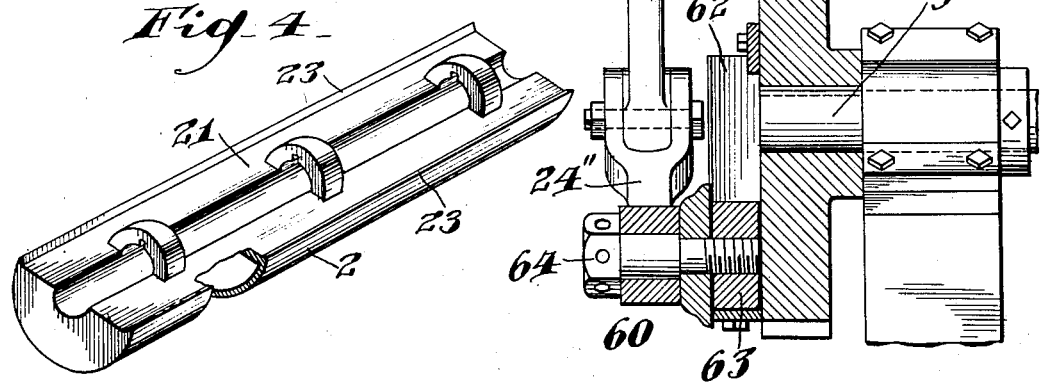
WITNESSES
INVENTOR
James Reagan
BY J. R. Nottingham
ATTORNEY

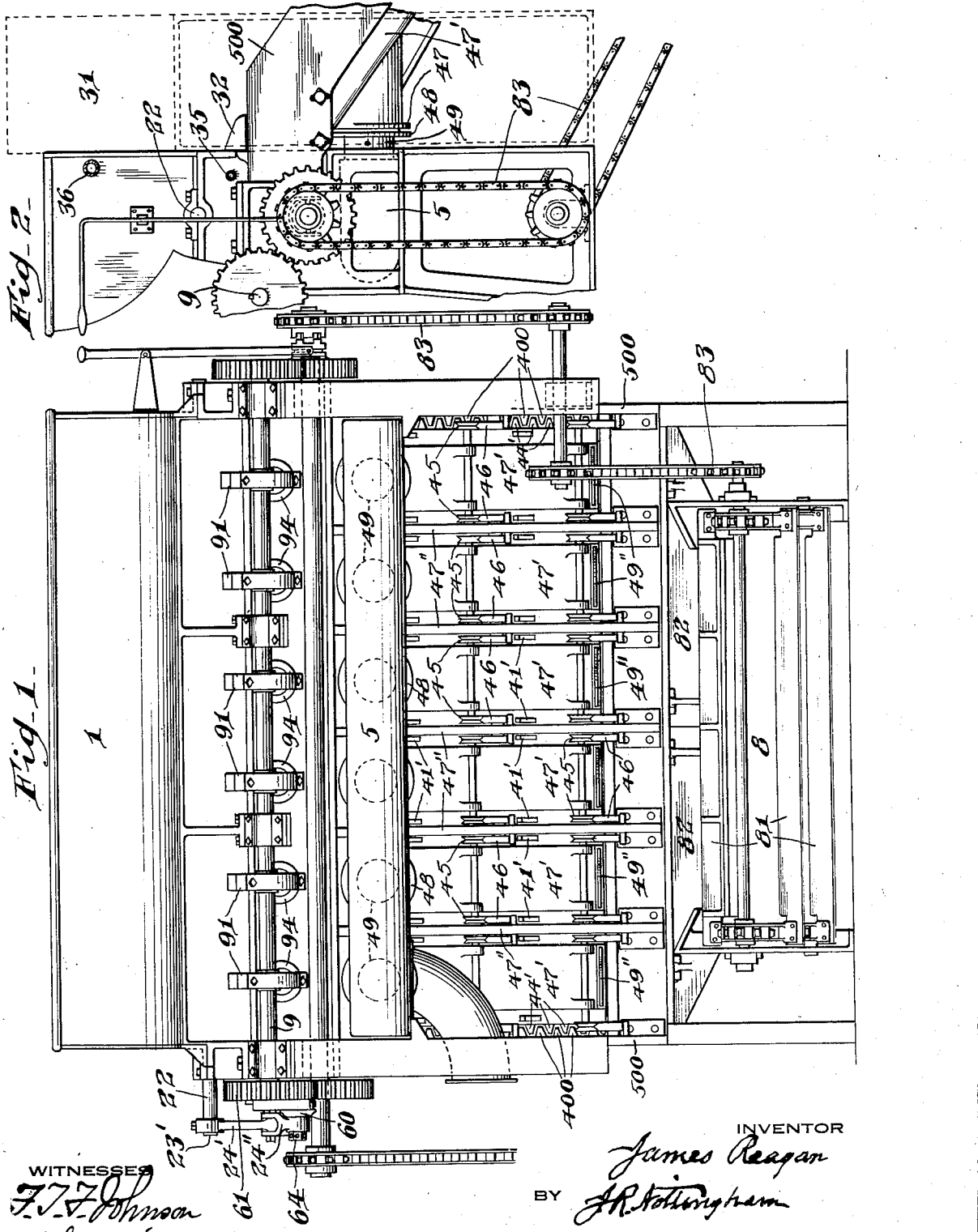

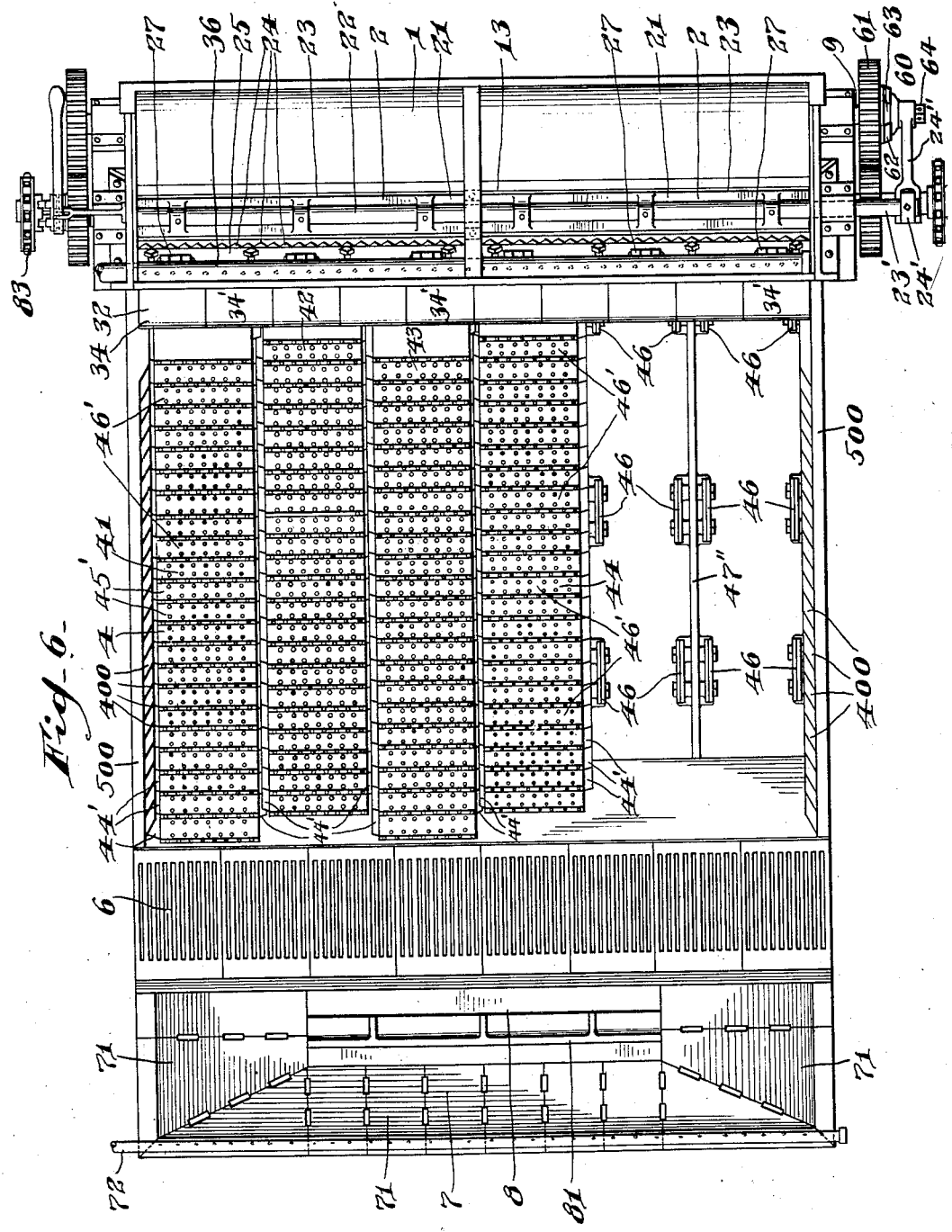

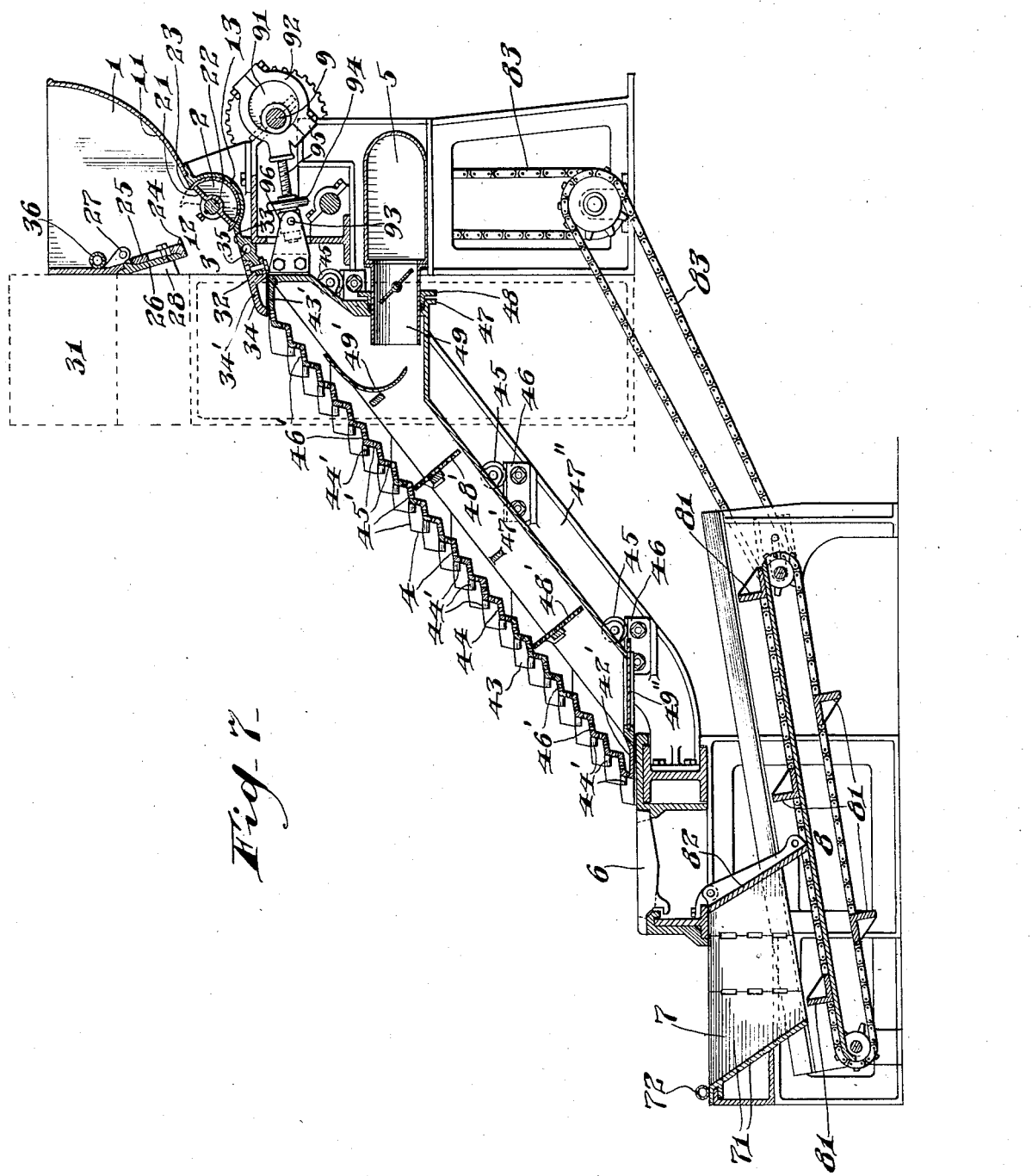

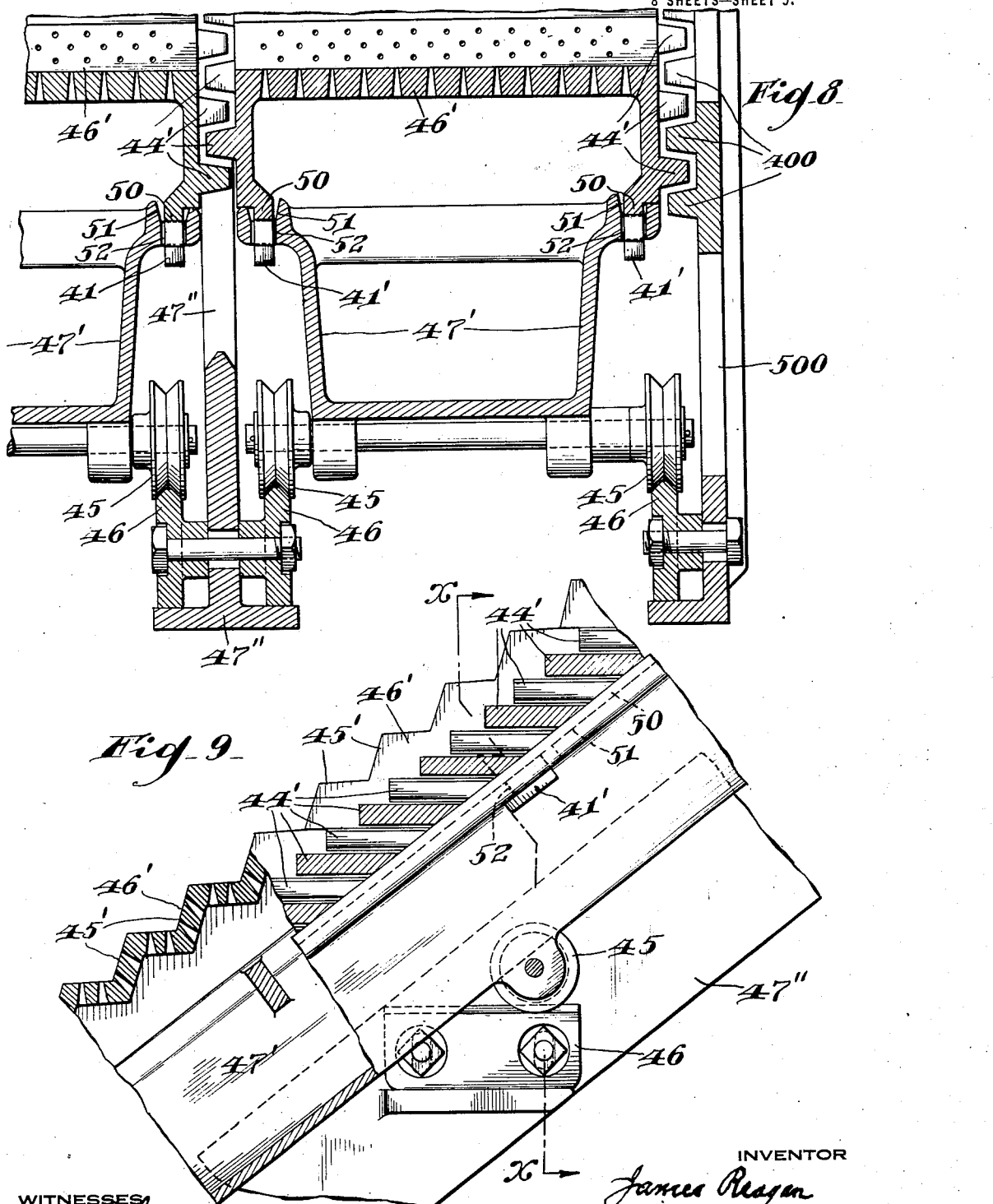

J. REAGAN.
BOILER AND OTHER FURNACE.
APPLICATION FILED AUG. 28, 1914. RENEWED OCT. 15, 1915.
1,171,803.
Patented Feb. 15, 1916.
8 SHEETS—SHEET 6.
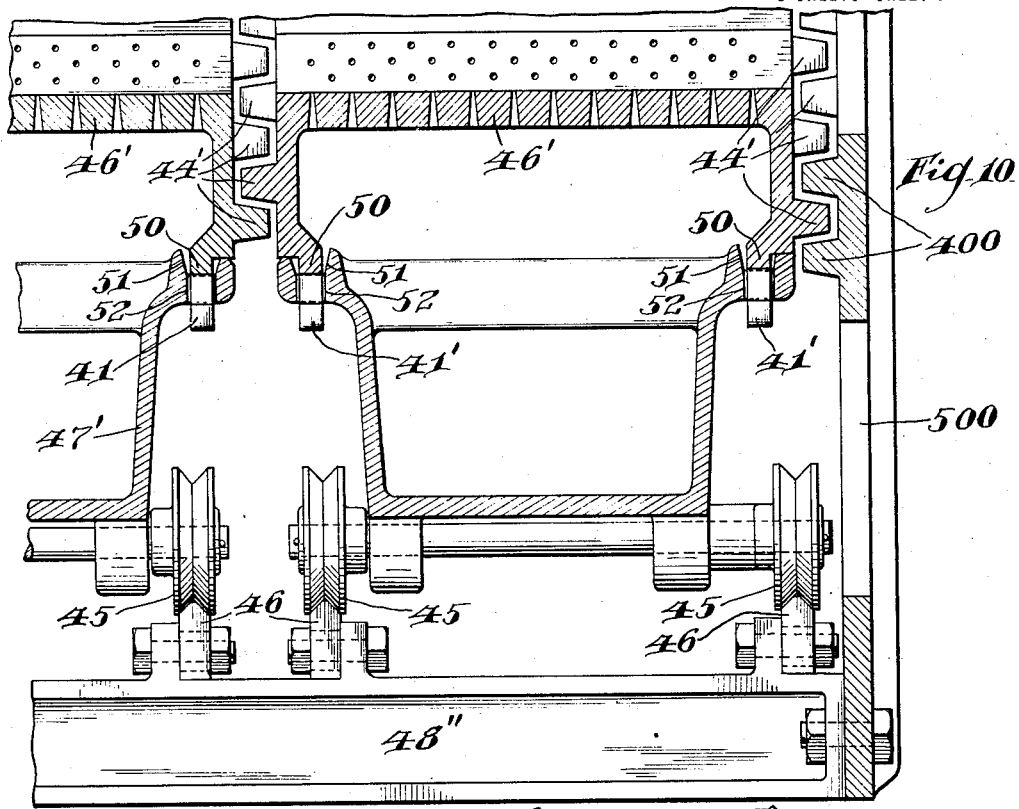
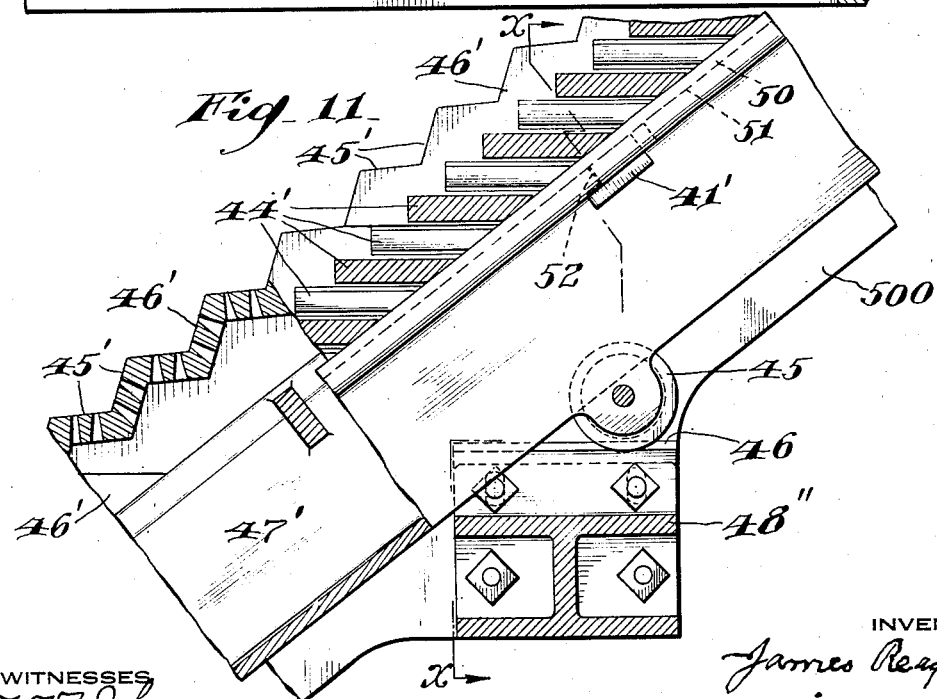
WITNESSES
INVENTOR
James Reagan
BY
J. R. Nottingham
ATTORNEY J. REAGAN.
BOILER AND OTHER FURNACE.
APPLICATION FILED AUG. 28, 1914. RENEWED OCT. 15, 1915.
1,171,803.
Patented Feb. 15, 1916.
8 SHEETS—SHEET 7.
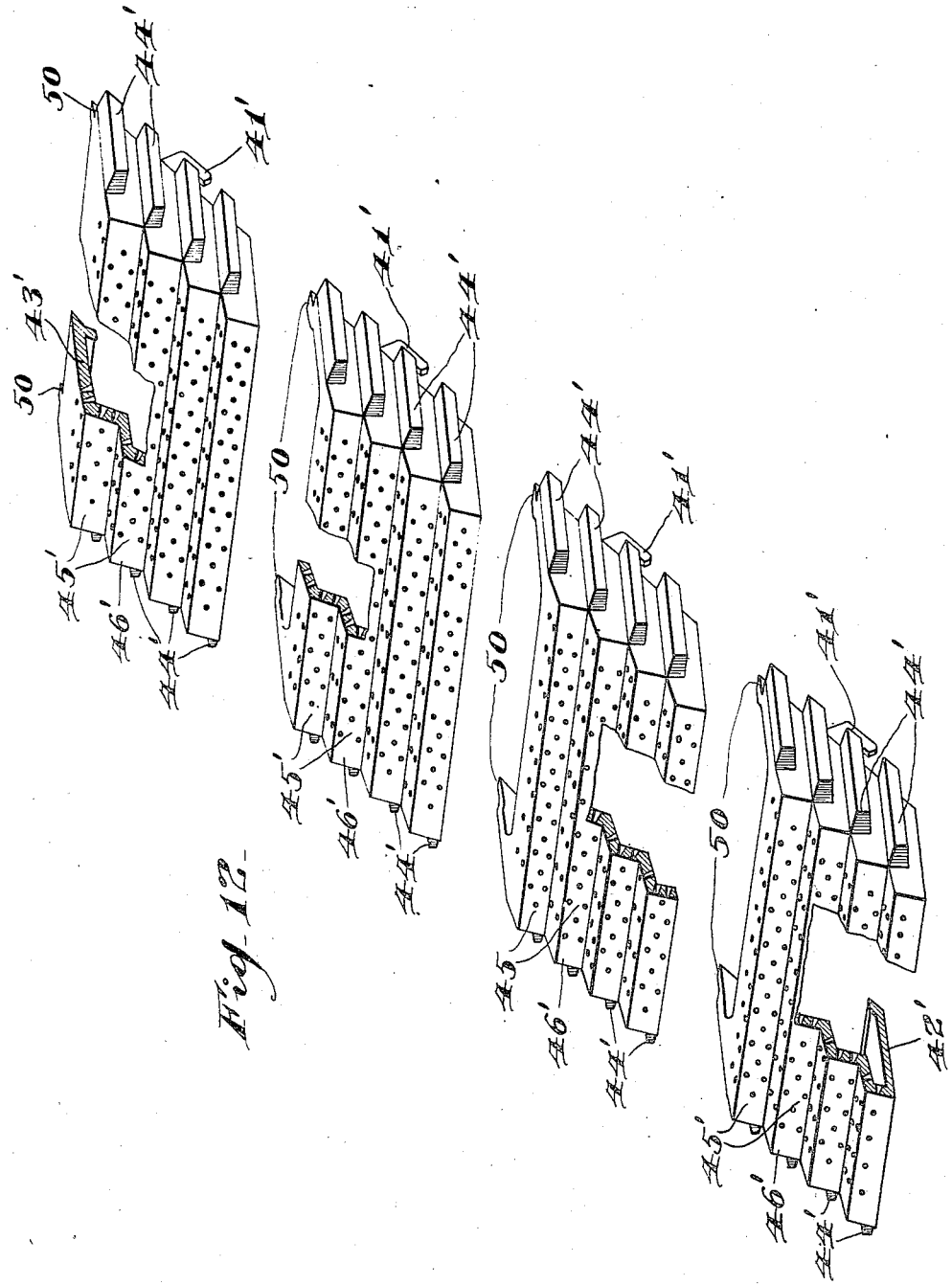
INVENTOR
James Reagan
BY
J. R. Nottingham
ATTORNEY
WITNESSES J. REAGAN.
BOILER AND OTHER FURNACE.
APPLICATION FILED AUG. 28, 1914. RENEWED OCT. 15, 1915.

1,171,803.

Patented Feb. 15, 1916.

UNITED STATES PATENT OFFICE.

JAMES REAGAN, OF PHILADELPHIA, PENNSYLVANIA.

BOILER AND OTHER FURNACE.

1,171,803.　　　Specification of Letters Patent.　　Patented Feb. 15, 1916.

Application filed August 28, 1914, Serial No. 859,070. Renewed October 15, 1915. Serial No. 56,144.

*To all whom it may concern:*

Be it known that I, JAMES REAGAN, a citizen of the United States, residing at Philadelphia, in the county of Philadelphia and State of Pennsylvania, have invented certain new and useful Improvements in Boiler and other Furnaces, of which the following is a specification.

My invention relates to boiler and other furnaces, and the furnace I have devised is especially designed to consume culm and other fine fuels, although it is also adapted for the burning of ordinary coal of different grades and characteristics.

Among the objects of the invention are proper control of the feeding of the fuel from the hopper to the furnace, the destructive distillation of the fuel at the mouth of the furnace, the production of a highly combustible gas from the gases liberated from the fuel in the zone of distillation, the perfect combustion of the solid carbonaceous portions of the fuel and of the distilled and produced gases, the prevention of the deposition of the soot and clinker upon the bridge-wall, and of soot upon the heat-absorbing surfaces of the boiler.

The several parts of the furnace, including the hopper, the feeder, the grate proper, and the rest grate, are very closely related to each other for they all coöperate in attaining a new and unitary result which is the transportation through and the burning of fine fuel in the furnace. The removal of the unburned residue is material to the operation of the furnace, for since it prevents the accumulation of clinker and of soot it helps to maintain the conditions which are essential to a complete and economical burning of the fuel.

Figure 13:
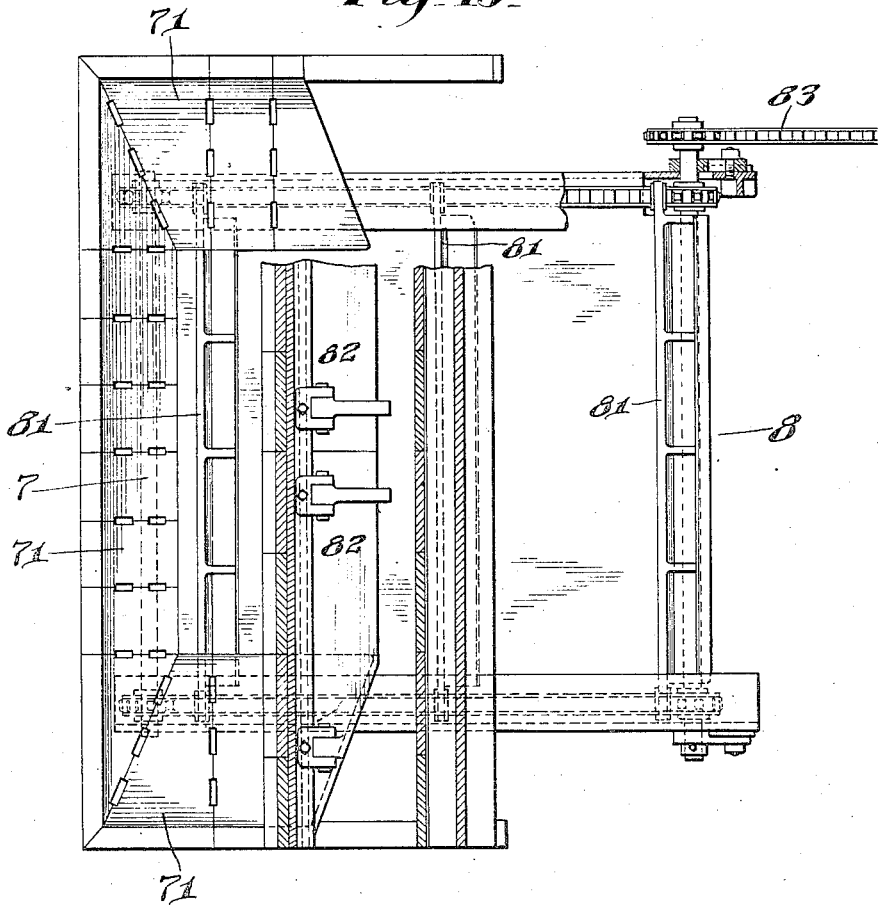
Figure 14:
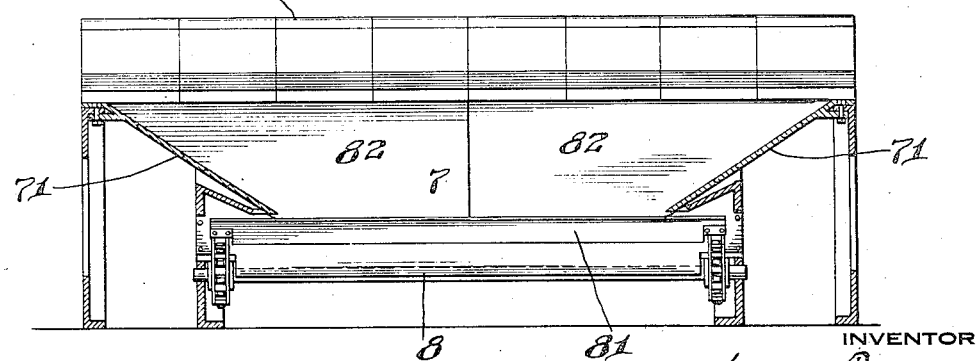

In the drawings Figure 1 is a front elevation of the furnace; Fig. 2, a side elevation showing a part of the furnace; Fig. 3, a side elevation of the opposite side of the same part of the furnace; Figs. 4 and 5, are detail views of parts of the fuel-feed; Fig. 6, a plan view of the entire furnace; Fig. 7, a longitudinal, vertical section of the entire furnace; Fig. 8, a partial transverse section of the grate on line X—X of Fig. 9; Fig. 9, a view partly in section and partly in perspective, showing the construction of the grate sections and their means of support; Figs. 10 and 11, similar views showing a modification of the supporting means; Fig. 12, a view showing the step-plates of the grate section detached; Fig. 13, a plan view, partly in section, showing the ash-pit and the carrier for the refuse material, and Fig. 14, a view showing the transverse section through the ashpit.

The main features of the invention are a hopper 1; an oscillatory fuel-feeder 2; an especially constructed gas producer 3, having a steam supply associated therewith; an inclined reciprocatory multi-part grate 4, including forced-draft sections arranged to receive solid fuel from the gas producer; an air-feeding trunk 5 for the forced-draft section; a rest grate 6 disposed at the bottom of the inclined grate, for burning the residual solid fuel; and a peculiarly-constructed ash-pit 7, situated between the rest grate and the bridge-wall, which adjoins the rest grate, certain features of which ashpit are designed to prevent the formation of clinker on the bridge-wall, and the deposition of soot on the boiler surfaces. The invention also includes details of construction for enabling the main features of the apparatus to perform their designed functions, and for causing all the movable parts to coöperate with each other in the required manner.

The hopper 1, which is situated at the front of the furnace, has a throat 12 formed by the downwardly-converging walls, and at this throat is placed an oscillator 2 having a semi-cylindrical form, the flat face 21 of which is normally a continuation of the wall 11 of the hopper. The oscillator is mounted on a shaft 22, suitably supported by bearings at its ends, and the end 23' of this shaft carries actuating-arms 24' and 24'' by means of which it is oscillated. To provide for the proper movement of the oscillator 2 in conjunction with the class of fuel used and the feed of fuel desired, I provide an adjustable eccentric mechanism 60 attached to the gear 61 which is secured to the eccentric shaft 9 upon which the eccentrics 91 are attached for transmitting the reciprocatory movement to the grates. The adjustable mechanism 60 consists in providing a dove-tail slide-way 62 on the gear 61, in this slideway a block 63 is positioned and can be secured in this slideway 62 at various distances from the center of the eccentric shaft 9 by the screw 64 on which the arm 24'' is pivoted, which in turn is pivoted on the arm 24' secured to the oscillator shaft 22. The hopper is provided with a semi-cylindrical pocket 13, conforming to the curvature of the oscillator. As the oscillator is operated, successive increments of the fuel are cut out from the mass within the hopper and thrust rearward toward the furnace mouth, and there is no opportunity for any part of the fuel to be caught between the moving parts, there being a close fitting of such parts. This feature entirely eliminates the danger of lumps of fuel being caught between parts and clogging the mechanism.

The upper edge of the oscillator is provided with a cutting edge (or teeth) 23, adapted to coöperate with a similar cutter 24 on the lower edge of the plate or door 25, adjustably-secured by bolts and slots to a plate 26 hinged at 27 to the back wall of the hopper. The plate 25 may be raised, as shown, when coarse fuel is fed, and lowered when fine fuel is fed to the furnace. When lowered the cutters 23, 24 are in operative opposed relation, and will reduce any coarse particles which may happen to be associated with the fine fuel. Uniformity of size of the delivered particles of fuel is thus substantially maintained. This is important, since constancy in the combustion is not attainable unless some ratio between the masses of the particles of fuel and the superficial areas of such particles is substantially maintained in all portions of the mass. The theoretically perfect condition is attained when all the particles are of about the same size, so that their gas evolving capacities are alike. In addition to this, large particles are objectionable because they would roll down the inclined grate of my furnace and would also admit of the passage of too much air around them, causing too much combustion at that place. Lugs 28 prevent the plate 26 from swinging backward, but it may be swung forward to give access to the parts behind it.

The gas producer 3 is formed by the arch 31, and in part by the dead-plate 32 which is a continuation of the oscillator 2. This dead-plate is made of two suitably mounted parts 33 and 34 which are bolted together, the part 33 having a passage 35 from which steam is to be discharged through perforations. To provide against the various conditions to which the part 34, of the dead-plate 32, is exposed, I provide the part 34 with the removable sectional members 34′, any of which may be removed in case of warping or burning, and a new member 34′ replacing the defective member. A pipe or passage 36 situated above the plate 25, delivers water through perforations to this plate and to the zone of distillation. The gases being thus associated with steam, chemical reactions occur which will enhance the value of the process and aid in the attainment of a perfect combustion. The plates 25, 26 are kept cool by the water flowing over them.

The inclined grate 4 is composed of a plurality of similar hollow, perforated sections 41, 42, 43, and 44, each of which is movably mounted by rollers 45 on tracks 46 for reciprocation. The tracks 46 may be supported on pendant parts 47″, Fig. 8, or on cross-beams 48″, Fig. 10. I provide a vertical adjustment of the tracks 46 in relation to the wheels 45 of the grate sections to insure an even horizontal movement to the grate sections in reciprocating back and forth. The grate sections are driven by a shaft 9, having thereon eccentrics 91 operating in straps 92 which are attached to the sections at the points 93. Between the straps and the plates 93 are adjustable devices controlled by hand-wheels 94 screw-threaded onto headed screws 95, each of which screws extends through a hole in a trunnion 96. When a hand-wheel is turned the stroke of a corresponding grate section is varied, and the rate of feed of the fuel thereon altered. Each hollow section is connected by a telescopic packed joint 47, 48, with a valve-controlled tube 49 extending from the air-trunk 5, which trunk is supplied with air under regulable forced draft. Adjacent to the outlet of the air tubes 49 into the troughs 47″ of the grate sections I provide a deflector-plate 49′ of the proper curvature and location to direct the maximum and diminishing to a minimum amount of air to the proper grate surface to produce the best results. The maximum amount of air is required where the coal is fed onto the grate, hence the greater area of the air outlet tube 49 in relation to the curved deflector-plate 49′ courses the air into the upper portion of the grate section. The air coming from the remaining area of the air-outlet of the tube 49 will follow the course of least resistance which is downward in the grate sections and will be bluffed by the perforated bluffers 48′, diminishing the supply of air to the grate surface as the coal descends.

The hollow sections consist of a trough 47′, upon the edges of which are placed the separate steps 46′ which together constitute the perforated stepped grate surface. Four of these steps are shown in Fig. 12. Each is a casting having corrugations or ribs 45′, the perforations being tapered and preferably extending through all of the angularly disposed walls. The rear edges of the steps are parallel with the corners of the corrugations. Along the rear edges of the stepped sections 46′ are provided tongues 50 which are adapted to be positioned in the grooves 51 in the upper edges of the trough 47′. The positioning of the tongues in the grooves of the troughs will prevent any transverse movement of the stepped section 46′ in relation to the troughs 47′. On the lower edges of the tongues 50 are depending notched lugs 41′ adapted to extend in the holes 52 in the trough 47' and lock the stepped section 46' to the trough, thereby preventing upward movement of the stepped sections. For cleaning the trough 47' of any soot or ash or dirt that may collect therein, I provide a sliding damper 49" which can be moved to an open position to allow the air to blow through the grate section and clean the same. On each side of the stepped sections are flanges 44' which loosely intermesh with similar flanges extending from the step of an adjacent grate section (Fig. 8). The air for the natural draft flows through the spaces between these intermeshing flanges which prevent the fine fuel from falling into the space below. The flanges all lie in parallel planes, and this arrangement enables the grate sections to be reciprocated, as described. The same scheme of flanges is carried into effect at the sides of the grates, there being similar flanges 400 on the side grate supporting-bars 500. The steps overlap, the lower edge of a higher one extending over the upper edge of a lower one, throughout the series, except as to those which are at the top and the bottom. The upper step is provided with a top 43' and the lower step is provided with a bottom 42'. The intermediate steps have neither top nor bottom since none is required.

The rest grate 6 may be of any suitable type. It should be of such area as to accommodate the solid fuel which reaches it until such fuel is burned. The declination of the grate 4 is such as to enable the fuel to remain at rest thereon until the grate is slightly agitated, and to admit of only a slow downward movement of the fuel when agitation of the grate occurs. The steps qualify the natural angle of repose of the fuel and retard the free flow when the grate sections are reciprocated. If the steps were not used the fuel would all run down the declivity and pile up on the rest grate.

The fuel by the time it reaches the middle part of the grate is largely in the form of coke, for it is subjected to nearly complete destructive distillation in the retort or producer 3, and to nearly complete combustion as it passes downward over the grate. The gases evolved are subjected to the action of steam at a temperature which will produce water gas, and this water gas and some small quantities of coal gas will unite in producing the combustion and maintaining the thermal conditions which are essential to the carrying on of the process as a whole. The amplitude of the reciprocation of the grate sections may be varied, as described, and the rate of fuel flow over the grate controlled. The ash-pit 7, to which the clinker will not adhere as it is made of iron, has sides and ends 71 which are set at an angle, preferably 45 degrees, and are finely perforated. At the top of the rear wall is a perforated water-pipe 72 which delivers water in a spray so as to wet the ashes and the dust. This prevents the ascent of dust to the boiler and the consequent accumulation of soot thereon, and so reduces the temperature as to prevent the formation of clinker on the adjacent bridgewall. Ashes falling through the ashpit reach the conveyer 8 which is of the link type and is provided with scrapers 81. A hinged door 82 keeps the air from flowing through the ashpit, but being hinged temporarily gives way to the scrapers as they pass it. The conveyer 8 is driven by a sprocket-chain 83 actuated by a certain train of gearing shown in Fig. 2 as being actuated by the main drive-shaft of the machine.

Having thus fully described my invention what I claim, is—

1. The combination of a grate, a hopper, and an oscillatory feeder, said feeder having an upper and a lower actuating face, the upper face being adapted to move transversely of the lower part of the hopper and cut out an increment of fuel therefrom, and the lower face being adapted to move such increment of fuel toward the grate.

2. The combination with a hopper, a grate, an oscillatory feeder having an upper and a lower actuating face, and a casing conforming to the rear side of said feeder, the feeder being so situated that its upper face will cut out an increment from a mass in said hopper during one oscillation and its lower face will advance such increment during an opposite oscillation.

3. The combination of a grate, a hopper, and an oscillatory feeder, said feeder having an upper and a lower actuating face, the upper face being adapted to move transversely of the lower part of the hopper and cut out an increment of fuel therefrom, and the lower face being adapted to move such increment of fuel toward the grate, the feeder having cutting teeth and a movable part of the hopper having cutting teeth adapted to coact therewith.

4. The combination with a hopper, of a fuel-feeder, a furnace having a grate, a water supply for delivering water to the fuel as it passes to the furnace, a part of the hopper heated by the furnace for heating the water, a steam supply delivering steam to the said fuel, the furnace being constructed to produce such thermal conditions near its mouth as to dissociate the moisture while destructively distilling the fuel.

5. The combination with a hopper, a fuel-feeder, a furnace having a grate, a water supply for delivering water to the fuel as it passes to the furnace, a door heated by the furnace for heating the water, a steam supply delivering steam to the said fuel, the furnace being constructed to produce such thermal conditions near its mouth as to dissociate the moisture while destructively distilling the coal.

6. A furnace grate, having in combination a two-part dead-plate, one part of which is composed of a number of removable sectional-members, and the other part of which is provided with a longitudinal steam-passage having discharge apertures leading therefrom, a hopper beyond the mouth of which the dead-plate extends, and a refractory mass situated above and adjacent to said dead-plate.

7. A furnace having in combination a hopper and means for supplying a layer of moistened fuel to the furnace, and means including a forced and a natural draft for feeding the fuel through the furnace, the receiving end of the furnace being constructed to act as a gas producer, whereby the fuel is destructively distilled and water-gas produced, said producer being disposed adjacent to the hopper and between said hopper and the grate, and the means for producing the forced and the natural drafts extending throughout substantially the entire combustion zone.

8. A furnace having in combination a hopper, a dead-plate at the entrance of the furnace, and a refractory arch situated near and above the dead-plate, said dead-plate and the refractory arch constituting part of a producer, means for supplying a layer of moistened fuel to said producer, and means for feeding the fuel through the furnace including a forced and a natural draft.

9. A furnace having at its entrance a gas producer, and containing a grate adapted to receive solid fuel from said producer, the grate being associated with means for simultaneously supplying throughout its length to different zones air under a natural and a forced draft.

10. A furnace grate having parallel sets of perforated fuel supporting plates, each in combination with a trough forming with it an inclined air-duct, the several air-ducts being spaced apart to admit of the flow of air between them, the adjacent sides of the plates having intermeshing and loosely fitting lugs.

11. A furnace grate having parallel sets of perforated fuel supporting plates, each in combination with a trough forming with it an inclined air-duct, the several air-ducts being spaced apart to admit of the flow of air between them, the adjacent sides of the plates having intermeshing and loosely fitting lugs, and certain of said air-ducts being horizontally and longitudinally movable.

12. A grate consisting of a series of angular step-plates, each of which is provided at each end with a flange having spaced lugs for intermeshing with the lugs on the flange of the adjacent plate, or with similar lugs on a side bar.

13. The combination with a trough having a groove in each of its edges and openings leading from the grooves, of a perforated plate provided with side flanges disposed in said grooves, and lugs extending from said flanges into and loosely fitting openings in said trough.

14. An inclined grate consisting of parallel troughs, spaced from each other, overlapping V-shaped step-plates supported by said troughs, each plate being removably connected with its supporting trough and having its upper edges disposed beneath and held down by the next adjacent plate, said plates being provided with upwardly converging openings, and means for supplying a forced draft to said troughs.

15. The combination of a plurality of adjacent inclined sets of detachable, overlapping sections or step-plates, means for permitting simultaneous reciprocation of the plates of each set, and intermeshing parallel lugs extending laterally upon each set and preventing, while intermeshing, the removal of the plates.

16. In a furnace, the combination of an inclined grate and an oscillatory double-acting fuel-feeder having upper and lower actuating faces, the upper face being adapted to move transversely of the lower part of the hopper and cut out an increment of fuel therefrom, and the lower face being adapted to move such increment of fuel toward the grate, and means for regulating the movement of the grate and fuel-feeder, whereby the speed of both may be uniform, or the speed of each varied.

17. A fuel-feeding device, including a hopper, and in combination a grate, an oscillator having two fuel actuating faces, one of which is disposed upon one side, and the other of which is disposed upon the other side of the center, whereby one is retracted and the other is advanced, one edge of said oscillator having cutting-teeth and an adjustable plate having cutting-teeth coöperating with the oscillator teeth to act as a crusher, said plate being capable of being withdrawn from coöperation with the oscillator teeth.

18. The combination with hollow grate sections having stepped and perforated tops, of perforated bluffers situated in said sections in the path of the air current, whereby the air is uniformly delivered from all portions of the grate sections.

19. The combination with a furnace of a fuel reservoir, means for cutting out increments of fuel from said reservoir, a coking plate exposed to radiant heat from the furnace and adapted to receive said increments of fuel, a gravity grate having steps and disposed at an angle to the coking plate and also provided with spaced hollow bars, and means for producing a forced draft through and permitting a natural draft between said bars.

20. The combination with a furnace of a fuel reservoir, means for cutting out increments of fuel from said reservoir, a coking plate exposed to radiant heat from the furnace and adapted to receive said increments of fuel, a gravity grate having steps and disposed at an angle to the coking plate and also provided with spaced hollow bars, and means for producing a forced draft through and permitting a natural draft between said bars, the stepped portions of the grate having converging air openings.

21. The combination with a furnace of a fuel reservoir, means for cutting out increments of fuel from said reservoir, a coking plate exposed to radiant heat from the furnace and adapted to receive said increments of fuel, a gravity grate having steps and disposed at an angle to the coking plate and also provided with spaced hollow bars, and means for producing a forced draft through and permitting a natural draft between said bars, there being at the foot of the gravity grate a horizontal rest grate.

In testimony whereof I affix my signature in presence of two witnesses.

JAMES REAGAN.

Witnesses:
 OTTO DUYDOPPEL,
 J. W. CASSIDY.